E. E. STEDMAN.

Pruning-Implement.

No. 6,261. Reissued Jan. 26, 1875.

Witnesses
Sarah Fitch
Louisa Walker

Inventor
Edward E. Stedman
by Bradford Howland
his Attorney.

THE GRAPHIC CO. PHOTO-LITH. 39 & 41 PARK PLACE, N.Y.

UNITED STATES PATENT OFFICE.

EDWARD E. STEDMAN, OF RAVENNA, OHIO.

IMPROVEMENT IN PRUNING IMPLEMENTS.

Specification forming part of Letters Patent No. 155,267, dated September 22, 1874; reissue No. 6,261, dated January 26, 1875; application filed November 20, 1874.

*To all whom it may concern:*

Be it known that I, EDWARD E. STEDMAN, of Ravenna, in the county of Portage and State of Ohio, have invented a new and useful Improvement in Pruning-Hooks, of which the following is a specification:

The invention consists in a double hook or cutter, constructed and attached to a pole or staff, as hereinafter fully described.

Figure 1:
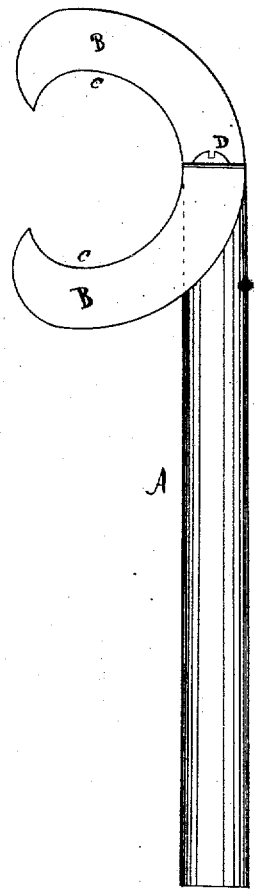
Figure 2:
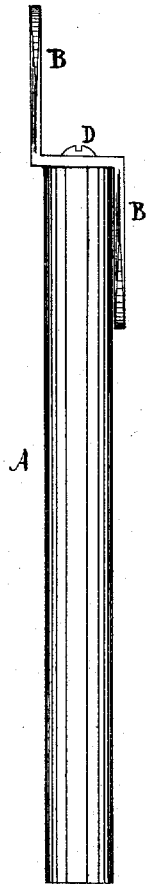

In the accompanying drawing Figure 1 is a side view, and Fig. 2 an edge view, of the pruning-hook attached to the handle.

Similar letters of reference indicate corresponding parts.

A is the handle or pole. B B are the cutters or blades. These blades are made of a single piece of steel, which is bent in the center at right angles with the blades for the space of one inch, more or less, to allow it to be attached to the end of the handle or pole, as seen in Fig. 2. The blades may also be made of separate pieces and attached to the pole in any other convenient manner. C C are the two cutting-edges, which, it will be seen, face each other, thus allowing the pruning-hook to be worked up or down, or by pushing or pulling, according to the position of the limbs or twigs to be cut off. The blades are parallel to the staff or handle, but in different planes, and have curved edges, as shown in Fig. 1. This arrangement adapts the implement for use in such a manner as to prevent the slipping of the blades lengthwise of the limb while making either an upward or a downward cut, as the blades are pressed against opposite sides of the limb while making the cut, the handle being held in a direction diagonal to the direction of the limb to be cut. The pressure of the blades on opposite sides of the limb while cutting it tends to prevent the bending of the limb. The planes of the blades being outside of the handle enables the operator to cut a limb close to the trunk of a tree. The blades are fastened to the handle by any suitable means, as seen in the drawing.

Should one of the blades be used more than the other and become dull, they may be reversed, so that the lower will become the upper blade, and vice versa.

Having thus described my invention, I claim as new and desire to secure by Letters Patent—

The cutters B B, bent in opposite directions, one upward and the other downward, so that their edges are toward each other, with their blades in different planes, but parallel, or nearly parallel, to each other and to the sides of the pole A, at the top of which they are secured, substantially as and for the purpose herein set forth.

EDWARD E. STEDMAN.

Witnesses:

GEORGE F. ROBINSON,
BRADFORD HOWLAND.